Patented Mar. 8, 1938

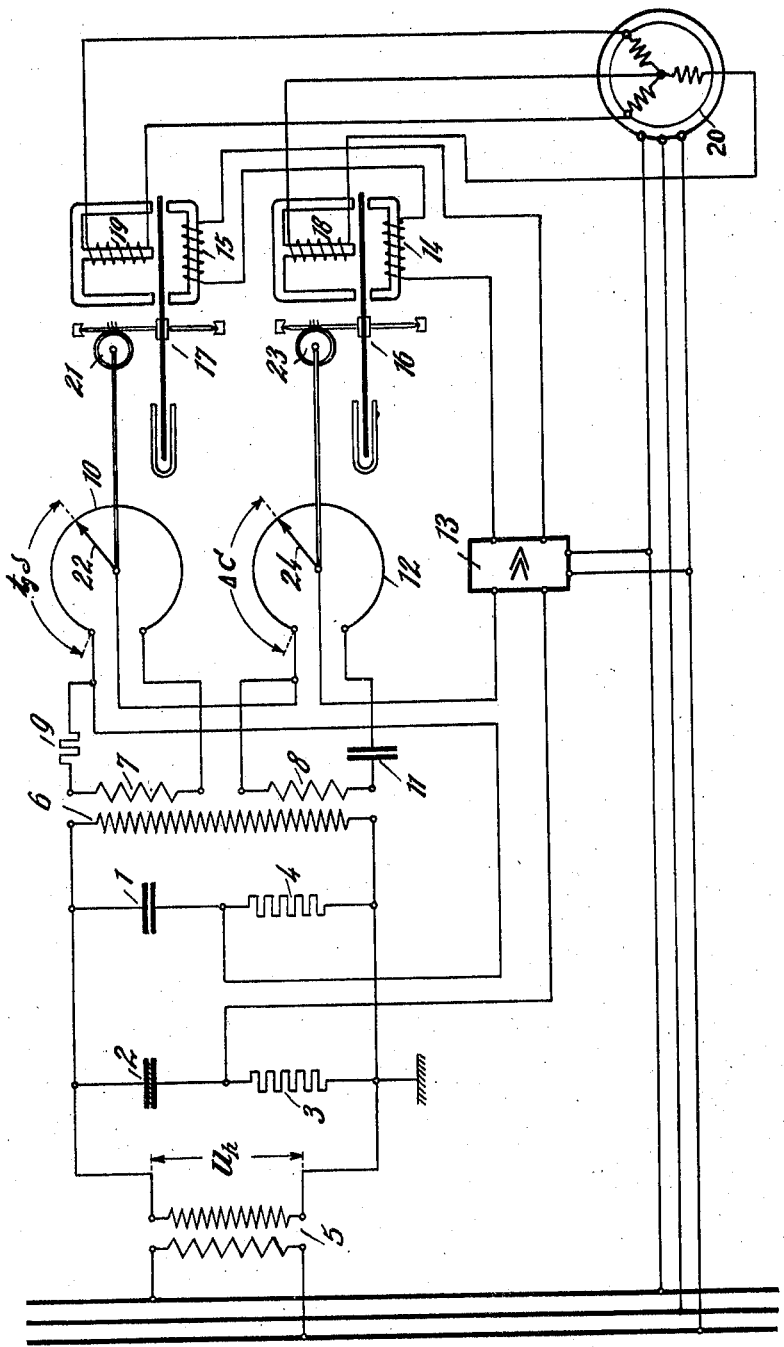

2,110,523

UNITED STATES PATENT OFFICE 2,110,523

BRIDGE AND SIMILAR CONNECTION FOR MEASURING ALTERNATING CURRENT

Wilhelm Geyger, Berlin-Schmargendorf, Germany, assignor to Siemens & Halske, Aktiengesellschaft, Siemensstadt, near Berlin, Germany, a corporation of Germany Application September 1, 1936, Serial No. 98,885
In Germany October 3, 1935

7 Claims. (Cl. 175—183)

My invention relates to bridges and similar connections for measuring alternating current, and more particularly to such bridge connections which are employed for measuring complex alternating-current quantities. As a rule, elements, either variable resistances or variable capacities, provided in such bridge connections and serving to balance the bridge are adjusted by hand. This kind of measurement is rather complicated and requires, besides accurately designed elements of the connections, practical knowledge and dexterity so that it did not come into extensive use.

It has already been proposed to facilitate the manipulation of the above-mentioned bridge connections by employing a deflection measurement. It is possible to effect a sensitive and accurate measurement with the aid of a deflection measuring instrument arranged in the measuring diagonal by adequately rating the individual bridge elements. However, in this case the disadvantage is by no means removed because elements of variable magnitude, preferably variable resistances, must be provided in the bridge so that contact resistances due to a false manipulation may affect the test reading. Furthermore, a highly sensitive measuring apparatus must be used for the deflection measurement which requires a very careful treatment.

The above-mentioned drawbacks are eliminated acording to the invention not by balancing the voltage applied to the measuring diagonal of the bridge to the zero value nor by utilizing it for a deflection measurement, but by measuring this voltage according to the compensation method. With such a measuring method control elements need only be provided within the bridge connection in order to insert the object to be measured in the circuit or to replace bridge elements by such of another order of magnitude so as to vary the measuring range. These control means may be easily designed in such a manner that contact faults may not occur even when used by persons having little experience. Contact faults occurring within the branch of the measuring diagonal cannot affect the accuracy of the measurements if the arrangement is designed in a suitable manner, since no current flows in the diagonal after the compensation.

For compensating the voltage applied to the measuring diagonal a complex compensator is employed. Particularly convenient and especially suitable for measurements to be taken during or within technical processes and operations is a form of compensator which brings about a full-automatic balance so that the attendants need only read off the adjustment of the compensator; this adjustment can also be automatically recorded by means of a recording instrument.

In the accompanying drawing an embodiment of my invention is illustrated in diagrammatic form. It is assumed that the capacity and the loss angle of a condenser is to be determined with the aid of a condenser measuring bridge. The bridge itself includes a standard capacity 1, the capacity 2 to be measured and two ohmic bridge resistances 3 and 4. The bridge is supplied with energy by a transformer 5 connected on the primary side to a power source. A potential transformer 6 is connected to the supply voltage $Uh$ of the bridge and provided with two secondary windings 7 and 8. In the circuit of the secondary winding 7 is inserted an ohmic resistance 9 and a slide wire 10, whereas a capacity 11 and a slide wire 12 are inserted in the circuit of the winding 8. The individual elements of the circuits 7, 9, 10 and 8, 11, 12 are so dimensioned that the voltages occurring in the slide wires 10 and 12 are exactly 90° out of phase, the voltage at the slide wire 10 being 180° out of phase with respect to the bridge supply voltage. In the measuring diagonal of the bridge are inserted portions of the slide wires 10, 12 capable of being tapped off, and the input circuit of a tube amplifier 13, which is preferably directly supplied with energy from the supply circuit feeding the bridge. The output circuit of the amplifier 13 contains the current windings 14 and 15 of two induction wattmeters 16 and 17 in series connection. The voltage coils 18 and 19 of both meters are energized through a phase advancer 20. The primary energy for the phase advancer is also taken from the supply circuit. The voltage coils 18 and 19 are connected on the secondary side to the phase advancer in such a manner that the voltages are 90° out of phase. The armature of the meter 17 is coupled with a rotatably mounted contact arm 22 through a worm drive 21, and the armature of the meter 16 with a rotatably mounted contact arm 24 through a worm drive 23.

The operation of the system is as follows:

If the capacity 2 to be measured would be as great as the standard capacity 1 and would also be free of losses, the bridge would be balanced and no current would flow in the measuring diagonal in case the ohmic resistances 3 and 4 have the same magnitude, provided that the contact arms 22 and 24 are in their home position. If the capacity 2 to be measured, and previously assumed as having the same magnitude as the standard capacity 1, is replaced by a capacity to be measured which is somewhat greater or smaller than the standard capacity but still free of losses, a current will flow in the measuring diagonal which is in phase with the currents flowing in the resistances 3 and 4. This current is amplified in the amplifier 13 either without changing the position of phase (even number of tubes) or by displacing the phase 180° (odd number of tubes) and supplied to both current coils 14 and 15 of the meters 16 and 17. The phases of the voltage coils 18 and 19 of the meters 16 and 17 are so displaced that with respect to the current flowing in the coils 14 and 15 one of the voltage phases is in phase with the current, whereas the other is 90° out of phase with regard to the current.

It is assumed that the current in the coil 19 is in phase with the current in the coil 15. In this case a torque will not be exerted on the armature of the meter 17, whereas a torque is exerted on the armature of the meter 16 in which the currents are 90° out of phase. The coupling with the contact arm 24 is so designed that by the following movement of the meter armature an increasing portion of the slide wire 12 is inserted in the measuring diagonal circuit. Since the voltage of the slide wire is opposite to the voltage in the measuring diagonal the difference in voltage applied to the amplifier 13 is steadily decreased by the movement of the meter until a complete compensation is brought about, so that any influence of the amplifier 13 at the input side ceases. However, also the current coil 14 is, consequently, completely deenergized so that the meter 16 comes to rest. In the case of a hunting the voltage in the slide wire 12 would predominate the voltage of the measuring diagonal. Consequently, the input voltage of the amplifier 13 would be displaced 180°. A current would, therefore, be supplied to the current coil 14 of the meter 16 which is displaced 180° and which would cause the meter 16 to rotate in the opposite direction.

If under the same conditions as above stated the loss free test condenser 2 is replaced by a loss showing condenser of the same capacity as the standard condenser 1, or if a loss is artificially produced, for instance, by connecting an ohmic resistance in series with the loss free condenser 2, the balance of the bridge is also disturbed so that in the measuring diagonal a current flows again, the phase of which is, however, in this case, 90° out of phase with respect to the current flowing through the resistance 4. Consequently, the meter 16 is not operated but the meter 17, which in turn moves the contact arm 22 until the counter voltage tapped by the contact arm 22 from the slide wire 10 and corresponding as to the phase to the voltage in the diagonal branch of the bridge is as great as the voltage in the measuring diagonal of the bridge. While, therefore, the angle of deflection of the arm 24 was a measure for the difference in the values of the capacities 2 and 1, the deflection of the contact arm 22 is a measure for the loss angle of the capacity 2.

The above given explanation refers for the sake of better understanding to simplified measuring conditions. The system is, however, also capable of indicating at the same time differences in capacity as well as losses because these two components to be measured are split up by the phase displacement of the voltage fields 18 and 19 and are separately compensated by the slide wires 10 and 12. No current flows in the measuring diagonal when the bridge is in a balanced state. Consequently, also sliding contacts or the like may be readily arranged within the measuring diagonal, since the variable resistances thereof cannot affect the test reading.

As above described, the voltage in the measuring diagonal of the bridge in the system according to the invention is automatically compensated for so that the system may be readily attended by persons of little experience. Besides the measuring instruments employed in the system, i. e., wattmeters, are instruments of a relatively sturdy and reliable type.

It is understood that the invention is not only applicable to the measurement of capacities but may also be applied to the measurement of any alternating-current resistances in which the splitting up of the current or voltage into two components is preferable. The calibration or the phase adjustment need only be effected once; in this case the phase advancer 20 may be, for instance, adjusted in the manner that a small auxiliary capacity free of losses be inserted in the bridge in parallel relation to the capacity 1. The phase advancer 20 must be then so adjusted that when switching on or off the auxiliary capacity only the meter 17 runs, whereas the meter 16 remains at rest. Phase displacements of 180° if necessary may be readily effected by reversal of polarity of connections. They are necessary if the direction of rotation of one of the meters must be changed.

I claim as my invention:

1. In an arrangement for measuring complex resistances, an alternating current source, a bridge circuit containing in one of its branches the impedance to be measured and in its other branches comparative impedances, and a compensating measuring system connected with the diagonal of said bridge circuit for measuring the voltage of said diagonal, said measuring system including means for producing and adjusting a counter voltage compensating the voltage of said diagonal in magnitude and phase.

2. In an arrangement for measuring complex resistances, an alternating current source, a bridge circuit containing in one of its branches the impedance to be measured and in its other branches comparative impedances, and compensating means in the diagonal of said bridge circuit for measuring magnitude and phase of the voltage applied to said diagonal.

3. In a system for measuring complex resistances, an alternating current source, a bridge arrangement of impedances connected with said current source and including in one of its branches the complex resistance to be measured, variable balancing means connected in the diagonal branch of said bridge arrangement for balancing the voltage applied to said diagonal branch, a wattmetric phase sensitive instrument arranged within said system, and a driving device connecting said instrument with said variable balancing means, said wattmetric instrument being electrically coupled with said diagonal branch so as to adjust said balancing means automatically in order to balance the voltage of said diagonal branch.

4. In a system for measuring complex resistances, an alternating current source, a bridge arrangement of impedances connected with said current source and including in one of its branches the complex resistance to be measured, two variable resistances inserted in the measuring diagonal of said bridge circuit, two wattmetric appliances each having a current coil, a voltage coil and a movable member disposed to be actuated by said coils, each of said two variable resistances being mechanically coupled with the movable member of one of said wattmetric appliances, said current coils being electrically coupled with said measuring diagonal, and phase displacing means arranged between said voltage coils and said current source, said means being so adjusted that each of said two wattmetric appliances control one of said two variable resistances for the compensation of one of the two components of the voltage of said diagonal.

5. In a system for measuring complex resistances, an alternating current source, a bridge arrangement of impedances connected with said current source and including in one of its branches the complex resistance to be measured, a potential transformer having one primary and two secondary windings, said primary winding being connected with the supply voltage of said bridge arrangement, two variable resistances inserted in the measuring diagonal of said bridge circuit, each having also a connection with one of said two secondary windings, said connections including means for producing a 90° phase displacement between the voltages occurring in said two variable resistances, and means for controlling said resistances in order to adjust their magnitudes for compensating the voltage supplied by said bridge arrangement to said diagonal, said means including wattmetric devices electrically coupled with said diagonal and mechanically connected with said variable resistances.

6. In a system for measuring complex resistances, an alternating current source, a bridge arrangement of impedances connected with said current source and including in one of its branches the complex resistance to be measured, a potential transformer having one primary and two secondary windings, said primary winding being connected with the supply voltage of said bridge arrangement, two variable resistances inserted in the measuring diagonal of said bridge circuit, each having also a connection with one of said two secondary windings, said connections including means for producing a 90° phase displacement between the voltages occurring in said two variable resistances, two wattmetric appliances each having a current coil, a voltage coil and a movable member actuated by said coils, each of said two variable resistances being operatively connected with one of said wattmetric apliances, an amplifier the input side of which is connected with said diagonal, its output side being connected with said current coils, and phase displacing means disposed between said voltage coils and said current source and being so adjusted that said wattmetric appliances control said resistances for the compensation of the voltage of said diagonal.

7. In an arrangement for measuring complex resistances, an alternating current source, a bridge circuit connected with said source and containing in one of its branches the impedance to be measured and in its other branches comparative impedances including a standard impedance, said comparative impedances being designed to retain their values during the measuring, a compensating system connected with said bridge circuit for balancing the voltage of the diagonal of said bridge, and means for indicating said balancing, said compensating system having variable means for adjusting said system and for indicating a value to be measured when in adjusted condition.

WILHELM GEYGER.